United States Patent [19]

Yoneda et al.

[11] Patent Number: 4,648,025
[45] Date of Patent: Mar. 3, 1987

[54] INTERACTIVE NUMERICAL CONTROLLER FOR A MACHINE TOOL

[75] Inventors: Takao Yoneda, Toyoake; Yasuji Sakakibara, Hekinan, both of Japan

[73] Assignee: Toyoda Koki Kabushiki Kaisha, Kariya, Japan

[21] Appl. No.: 742,118

[22] Filed: Jun. 6, 1985

[30] Foreign Application Priority Data

Jun. 11, 1984 [JP] Japan .................. 59-120604

[51] Int. Cl.[4] ............... G06F 15/46; G05B 19/18
[52] U.S. Cl. .................. 364/171; 51/165.71; 364/474
[58] Field of Search ........... 364/474, 475, 167–171, 364/188, 189, 191–193; 51/165.71–165.77, 165.83, 165.87, 165.88; 318/568, 569, 571

[56] References Cited

U.S. PATENT DOCUMENTS

| | | | |
|---|---|---|---|
| 4,293,913 | 10/1981 | Nishimura et al. | 364/474 |
| 4,489,522 | 12/1984 | Henseleit et al. | 364/474 X |
| 4,490,781 | 12/1984 | Kishi et al. | 364/191 |
| 4,502,125 | 2/1985 | Yonedat et al. | 364/474 |
| 4,521,860 | 6/1985 | Kanematsu et al. | 364/474 |
| 4,530,046 | 7/1985 | Munekata et al. | 364/191 |
| 4,556,833 | 12/1985 | Kishi et al. | 364/474 X |
| 4,571,670 | 2/1986 | Kishi et al. | 364/474 X |

Primary Examiner—Joseph Ruggiero
Attorney, Agent, or Firm—Oblon, Fisher, Spivak, McClelland & Maier

[57] ABSTRACT

A numerical controller for a grinding machine is provided with a memory device, a data processor, a data input device, a display device and a manual pulse generator. After the setting positions of a grinding wheel carrier, a tail stock and the like of the grinding machine are changed in connection with the replacement of a grinding wheel with new one and the change in kind of workpieces, the input device is manipulated to display a desired one of images on the display device. The manual pulse generator is then operated to move components such as the grinding wheel carrier and a work table to a state indicated by the displayed image, and a storage command switch of the input device is depressed. In response to this depression, the data processor reads the present positions of the components in the state displayed on the display device and calculates based upon the read present positions data which is used in numerically controlling a machining operation of the grinding machine. The data processor carries out such calculation using one of equations determined depending upon the state being displayed on the display device and then, stores the calculated data in a storage area of the memory device determined by the state being displayed on the display device.

4 Claims, 9 Drawing Figures

INTERACTIVE NUMERICAL CONTROLLER FOR A MACHINE TOOL

BACKGROUND OF THE INVENTION

1. Field of the Invention:

The present invention relates in general to an interactive numerical controller for a machine tool such as, preferably, a grinding machine. More particularly, it relates to such an interactive numerical controller of the type that enables an operator to input in a conversational mode data necessary for use in a subsequent machining operation performed in accordance with a numerical control program.

2. Description of the Prior Art:

Generally, in numeral control machine tools such as grinding machines, various position data which are used in controlling the machine tool in accordance with a numerical control program have to be input into a numerical controller for the machine tool prior to the execution of machining operations. This preparatory data input procedure must also be done when the initial setting positions of the machine components are changed in connection with the change in kind of workpieces to be machined, the replacement of a life-expired grinding wheel with a fresh one and so forth.

In a known numerical control grinding machine, when the above-noted various position data are to be input into a numerical controller, a data table which lists code numbers corresponding to data items to be input is called out and displayed on a cathode ray tube (CRT) screen. A cursor on the CRT screen is moved to designate a code number corresponding to a data item to be input, and then, alphanumeric keys are manipulated to input new data. Numerical data to be input by the alphanumeric keys include those which are to be calculated by an operator, and are therefore troublesome to calculate. Further, a code allocation table is necessary for the operator to understand the relation between the code numbers and data items to be input.

That is, when preparatory position data are input manually by an operator to the numerical controller, some of the data are calculated by the operator. This may cause errors to be involved in such calculation, thereby resulting in elongating the time taken for program debugging. In addition, reference to the code allocation table makes the data input procedure complicated, and the setting of the cursor at a wrong portion on the CRT screen may cause the input data to be stored in a storage area other than an intended storage area.

SUMMARY OF THE INVENTION

Accordingly, it is an object of the present invention to provide an improved numerical controller of the character that when a machine tool is operated in manual mode to such a state as to coincide with an image being displayed on a display device, data which are used in controlling machining operations of a machine tool in accordance with a numerical control program are automatically calculated and stored in a memory areas allocated thereto, prior to the machining operations.

Briefly, in a numerical controller according to the present invention, various images each showing the state to which components of a machine tool are to be moved are selectively displayed on a display screen after the initial position settings of the components are completed. Then, the machine tool components are moved in a manual mode to the state displayed on the display screen. Positions of the machine tool components in the state being displayed on the display screen are read to calculate data to be input, based thereupon. The mode of such calculation is determined depending upon the state being displayed on the display screen. The calculated data is then stored in an address of a memory device which is determined depending upon the state being displayed on the display screen, for subsequent use in a machining operation performed in accordance with a numerical control program.

With this configuration, data to be input prior to the machining operation and a memory area in which the data is to be stored are determined by the selection of a state image to be displayed on the display screen. Moreover, present positions of the machine tool components in the state being displayed on the display screen are put into one of equations determined depending upon the state being displayed on the display screen, and data necessary for the subsequent numerical control in machining operations can be automatically calculated and stored in a right address of the memory device. Consequently, an operator can be relieved of not only the calculation of such data, but also the designation of a memory address.

BRIEF DESCRIPTION OF THE ACCOMPANYING DRAWINGS

The foregoing and other objects, features and many of the attendant advantages of the present invention will be readily appreciated as the same becomes better understood by reference to the following detailed description of a preferred embodiment when considered in connection with the accompanying drawings, wherein like reference numerals designate identical or corresponding parts throughout the several views, and in which.

Figure 9:
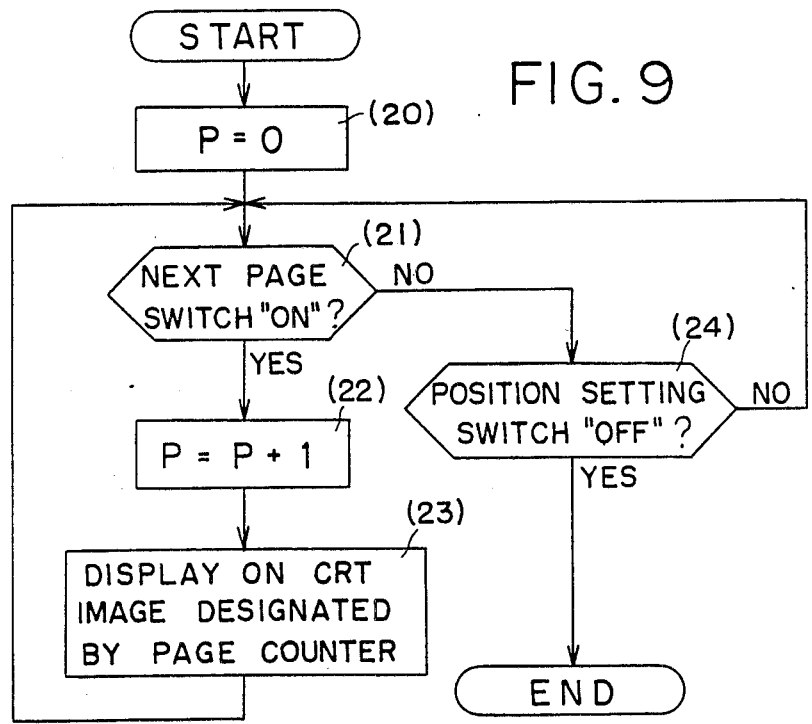
Figure 8:
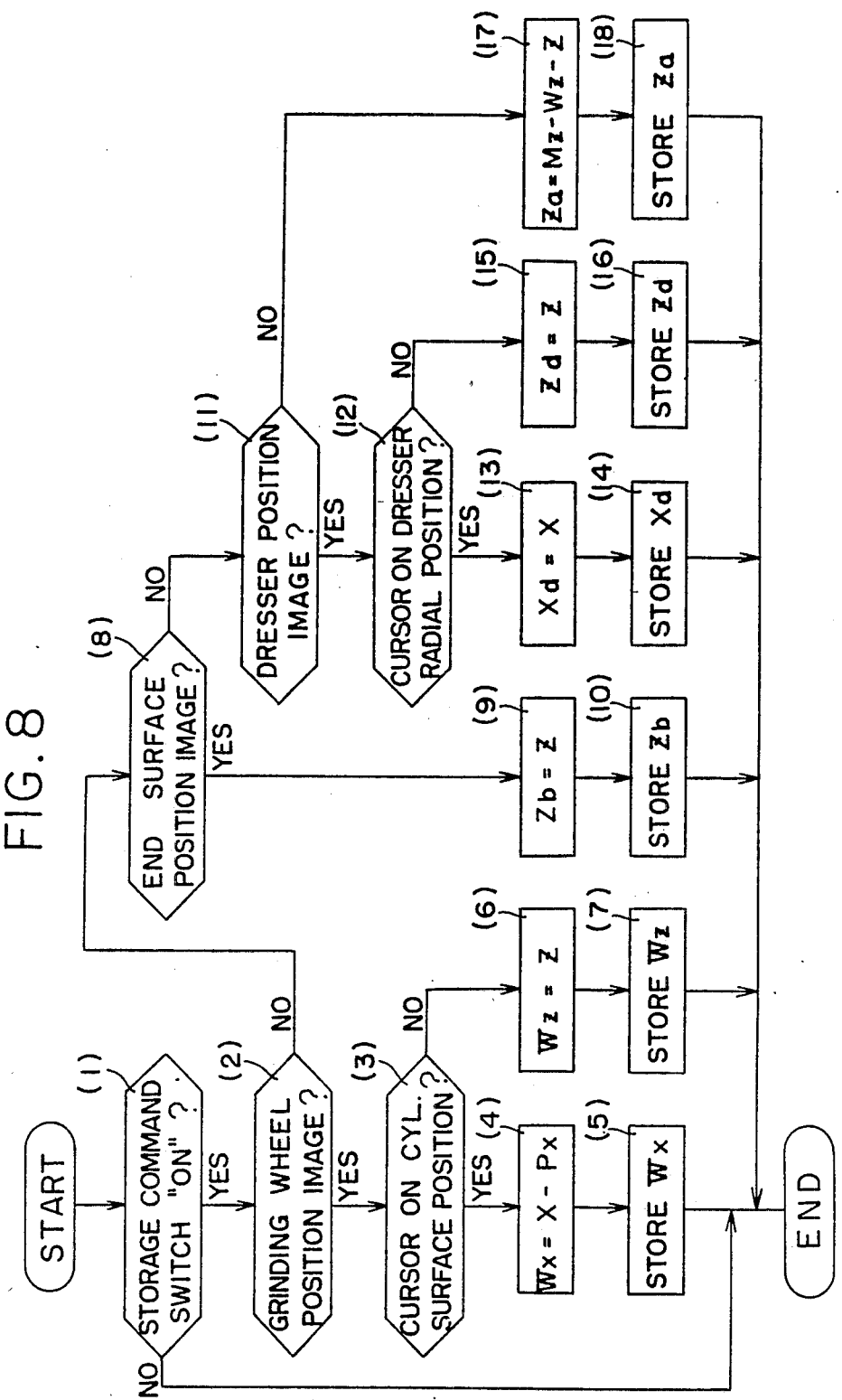

FIG. 8 is a flow chart of a system program executed by a central processing unit of the numerical controller for automatically obtaining data to be input and for storing the data in a right memory address allocated thereto; and FIG. 9 is a flow chart of another system program executed by the central processing unit for enabling an operator to select one of the images shown in FIGS. 2 through 5 which is to be displayed on the CRT screen.

DETAILED DESCRIPTION OF THE PREFERRED EMBODIMENT

Figure 1:
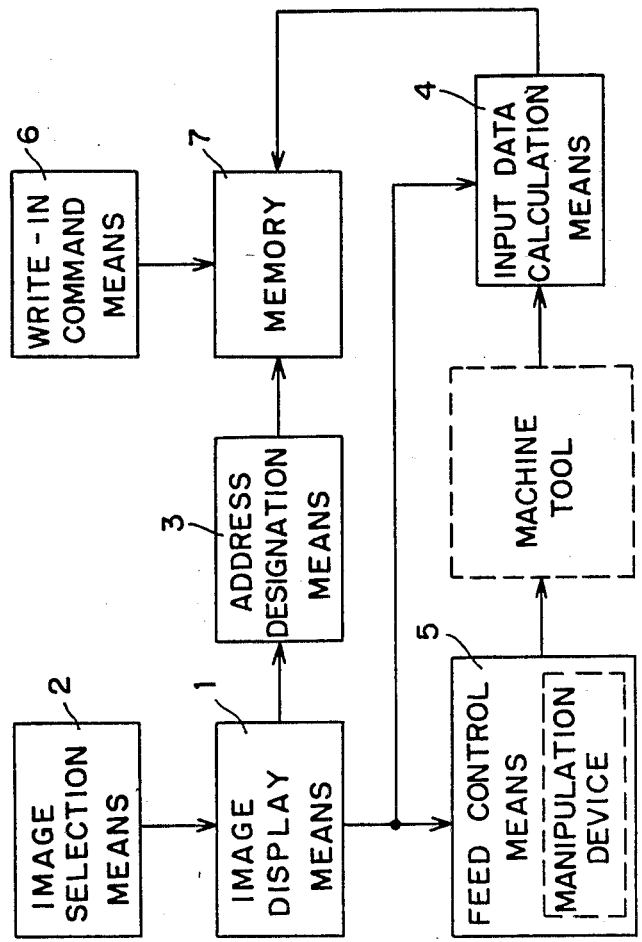
FIG. 1 is a block diagram illustrating the concept or principle of an interactive numerical controller according to the present invention.

Referring now to FIG. 1, the present invention is illustrated having a general construction for changing set position data to meet the state of a numerical control machine tool afte the setting position of each component relative to another component of the machine tool is changed with the change in kind of workpieces. Although the present invention is applicable to various types of numerical control machine tools with a conversational function, a computerized numerical control grinding machine will be described hereafter in detail as a preferred embodiment of the present invention.

A CRT screen (not shown in FIG. 1) is provided as means of conversation between an operator and the machine. Image display means 1 selectively displays on the CRT screen image patterns shown in FIGS. 2 through 5 in dependence upon the state (i.e., the positional relation between a grinding wheel head and a work table) of the grinding machine for which the change in initial setting data is to be performed. Image selection means 2 selects the images of FIGS. 2 through 5 to be displayed. Each of the images shows a different machine state, and data to be input and memory addresses in which the data are to be stored are different depending upon the displayed images. Thus, memory address designation means 3 designates memory addresses in which input data are to be stored, depending upon the displayed image, so that dimension and position data displayed on the screen can be stored in memory addresses respectively allocated thereto.

Figure 2:
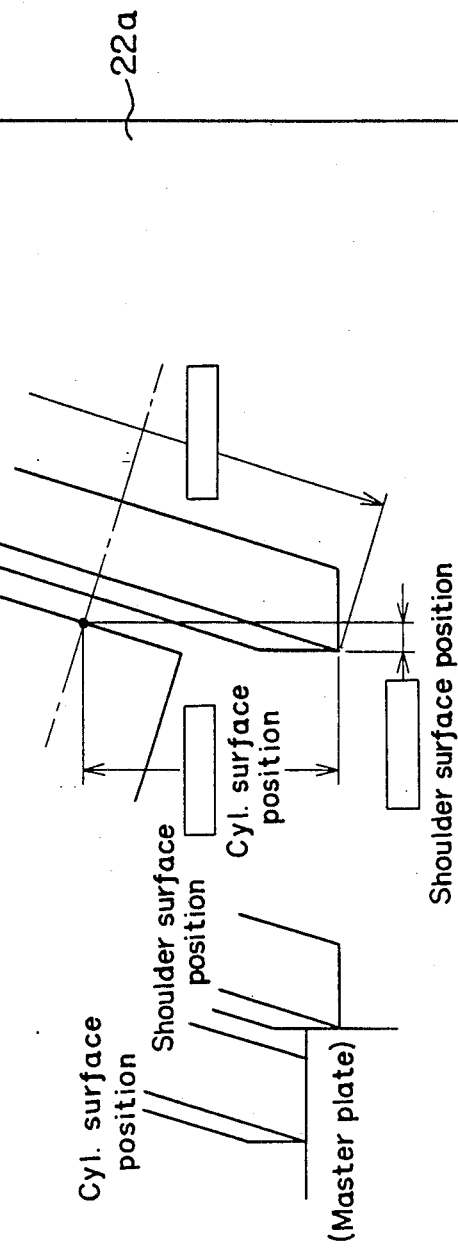
FIG. 2 is an image displayed on a CRT screen for setting the size and positions of a new grinding wheel.

Position data to be written in memory addresses may not be measured by the operator or may not be obtained without calculation by a portable calculator. When the machine is brought into the state as displayed on the CRT screen, input data calculation means 4 reads present positions of the machine components and obtains input data through calculation if necessary. In order to bring the machine to the state shown by the CRT screen, there is provided feed control means 5 having a manipulation device. When feed axes for a grinding wheel head and a work table are selectively designated and a manual pulse generator is turned, the feed control means supplies feed pulses to a servomotor for the wheel head or the work table so as to control the movement thereof. For example, as shown in FIG. 2, the position of a cylindrical grinding surface of the grinding wheel is to be input, the grinding wheel head and the work table are moved to such respective positions as to bring the cylindrical grinding surface into a slight contact relation with a master plate which is provided on a work head as will be described later in detail.

Figure 6:
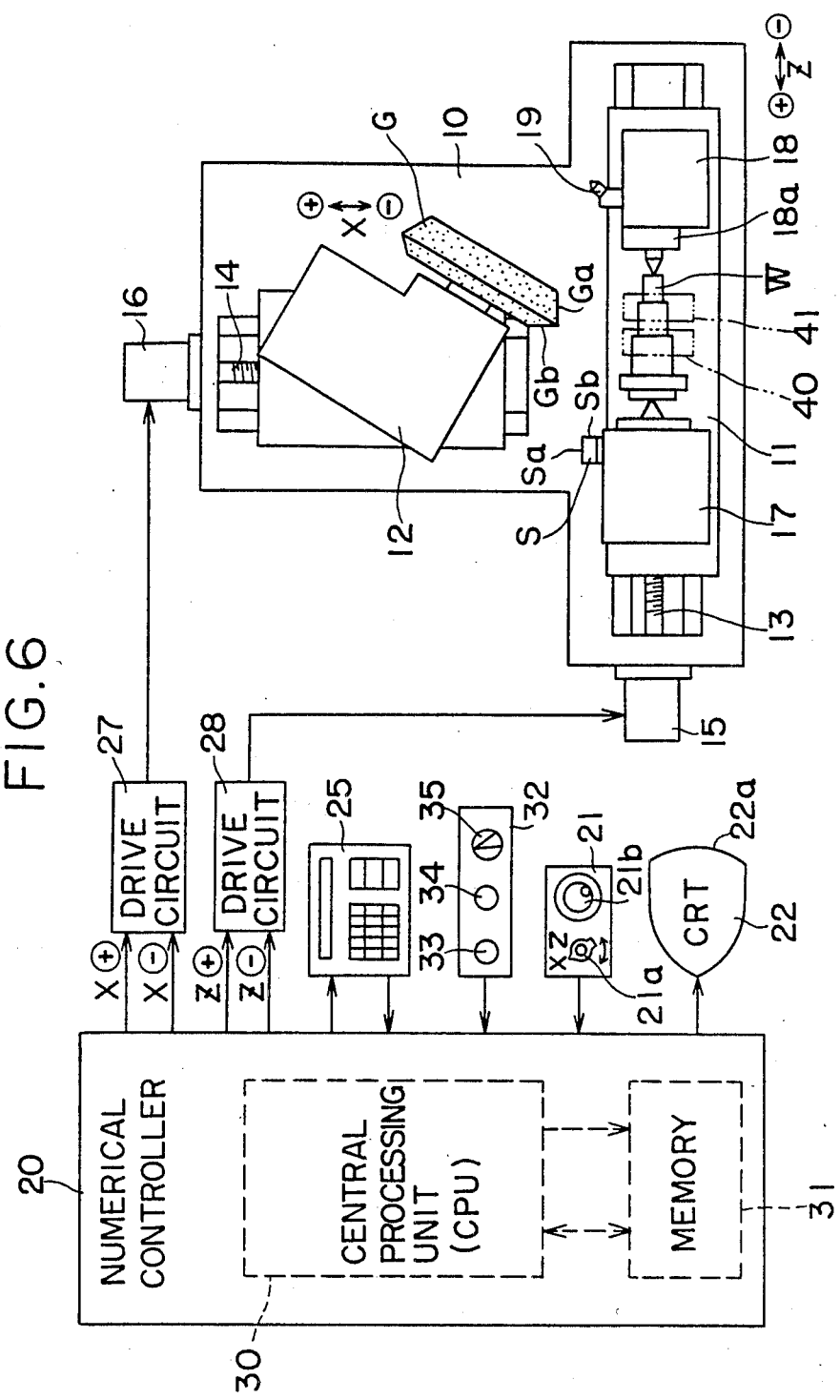
FIG. 6 is a schematic plan view of a numerical control grinding machine, also illustrating the configuration of the numerical controller according to the present invention.

The grinding machine is constructed as illustrated in FIG. 6. The wheel head 12 and the work table 11 are mounted on a bed 10 for movements in X and Z-axis directions perpendicular to each other. An angle type grinding wheel G is rotatably carried on the wheel head 12, while a work head 17 and a tail stock 18 are mounted on the work table 11. The work head 17 is provided with the master plate S used for setting positions of cylindrical and shoulder grinding wheel surfaces Ga and Gb, whereas the tail stock 18 is provided with a dressing tool or dresser 19. Feed screw shafts 14 and 13 are threadedly engaged with the wheel head 12 and the work table 11 and are rotatable by servomotors 16 and 15, respectively. These servomotors 16 and 15 are connected to drive circuits 27, 28 and are controllable in response to feed pulses supplied from a numerical controller 20 to the drive circuits 27 and 28, respectively. The numerical controller 20 is composed of a central processing unit (hereafter referred to as "CPU") 30, which is programmed to control the drive units 27, 28 in accordance with a numerical control program stored in a memory 31.

Figure 7:
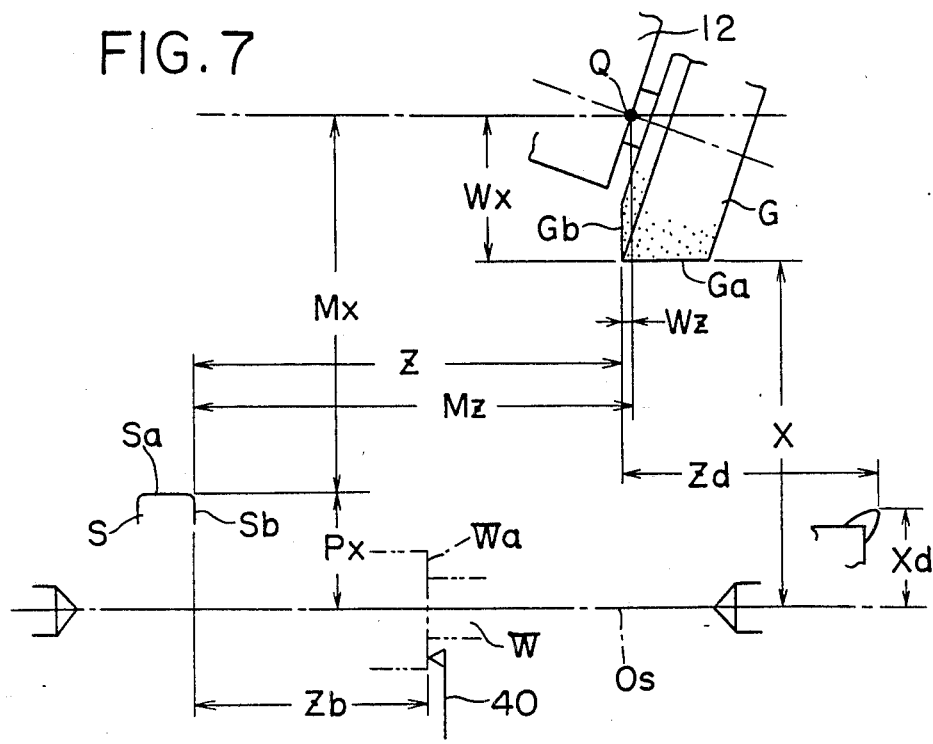
FIG. 7 is an explanatory view illustrating the positional relation of a grinding wheel with a workpiece axis, a reference plate and a dressing tool.

Referring now to FIG. 7, the present position of the grinding wheel G is represented by the position X of the cylindrical grinding surface Ga relative to a workpiece rotational axis Os, and the present position of the work table 11 is represented by the position Z of the shoulder grinding surface Gb relative to an axial reference surface Sb of the master plate S. Where in FIG. 7, a symbol Px represents a distance between a radial reference surface Sa of the master plate S and the workpiece rotational axis Os, a symbol Mx a distance between the radial referenced surface Sa and a reference point Q of the wheel head 12 in the X-axis direction, a symbol Wx a distance between the reference point Q and the cylindrical grinding surface Ga in the X-axis direction, a symbol Mz a distance between the reference point Q and the axial reference surface Sb, and a symbol Wz a distance between the reference point Q and the shoulder grinding surface Gb in the Y-axis direction, the present positions X and Z are calculated by the following equations (1) and (2), respectively.

$$X = Mx + Px - Wx \tag{1}$$

$$Z = Mz - Wz \tag{2}$$

The calculations and storages of various position data are carried out based upon the present positions X and Z as follows:

I. Grinding Wheel Positions

Right after the replacement of the grinding wheel G with new one, the positions Wx and Wz of cylindrical and shoulder grinding surfaces Ga, Gb of the new grinding wheel G relative to the wheel head reference point Q have to be set.

To this end, an image shown in FIG. 2 is displayed on a screen 22a of a CRT unit 22 (FIG. 6), and the wheel head 12 and the work table 11 are moved in a manual mode to bring the cylindrical grinding surface Ga into slight contact with the radial reference surface Sa of the master plate S. Then, a cursor (not shown) on the CRT screen 22a is moved into a rectangular frame for the cylindrical surface position, and a position storage command switch 33 of a switch box 32 shown in FIG. 6 is depressed. In this case, the values Wx and Wz are cleared to zero right after the grinding wheel replacement, whereby relations $X = Mx + Px$ and $Z = Mz$ are made in the state shown in FIG. 7 wherein the wheel head 12 and the work table 11 are located at respective original positions. Upon depression of the command switch 33, the CPU 30 of the numerical controller 20 executes steps (1), (2), (3), (4) and (5) in FIG. 8 and subtracts the known value Px from the present position X to calculate the position Wx of the cylindrical grinding surface Ga of the replaced new grinding wheel G relative to the wheel head reference point Q. In step (5), an address of the memory 31 for storage of the position Wx is designated to store the calculated position Wx therein.

To move the wheel head 12 and the work table 11 in the manual mode as described above, the numerical controller 20 is connected to a manual pulse generation unit 21 composed of an axis selector switch 21a and a pulse generation handle 21b. That is, when an axis selection signal and feed pulses are input to the numerical controller 20, the same distributes the feed pulses to one of the drive circuits 27, 28 designated by the axis selection signal, as is well known in the art.

Further, after the cursor on the CRT screen is moved into a rectangular frame for the shoulder surface position, the axial reference surface Sb of the master plate S is brought in the above-noted manual mode into slight contact with the shoulder grinding surface Gb of the grinding wheel G. The position storage command switch 33 is then depressed, in response to which the CPU 30 executes steps (1), (2), (3) and (6). Thus, the present position Z of the work table 11 at this time is set as the position Wz of the shoulder grinding surface Gb relative to the reference point Q in the Y-axis direction. A memory address for the position Wz is designated in step (7) to store the calculated position Wz therein.

Figure 3:
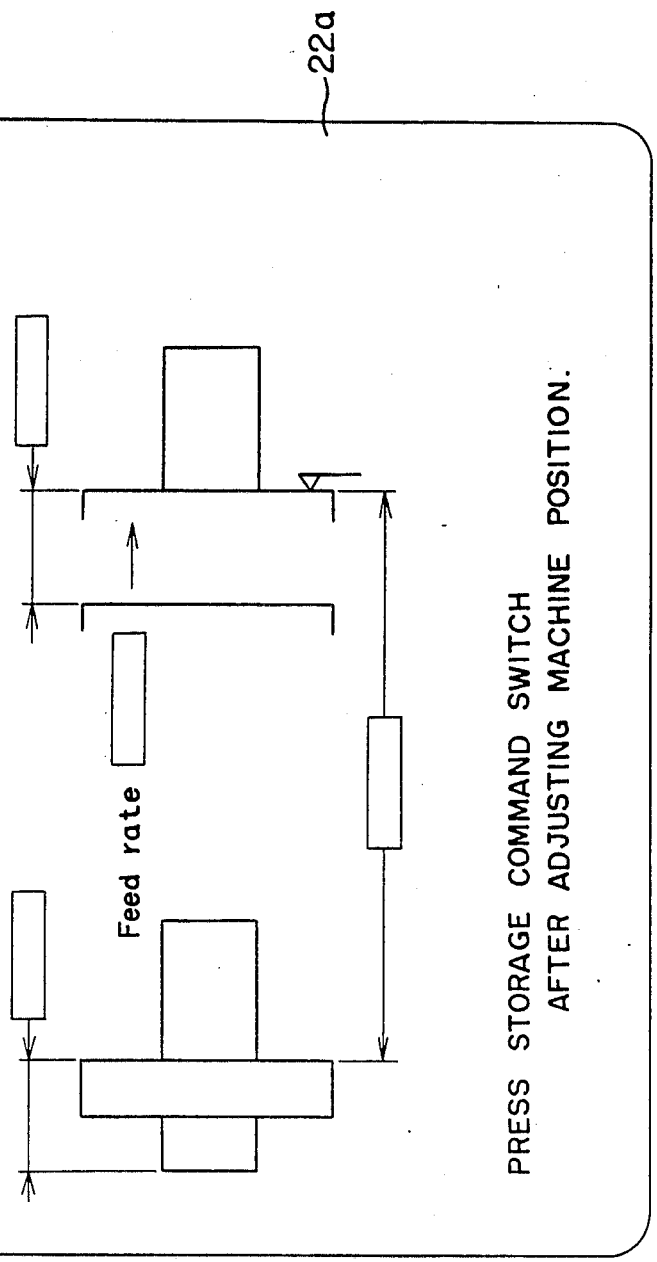
FIG. 3 is another image displayed on the CRT screen for setting the position of an end surface measuring device.

II. End Surface Measuring Position

Where the position at which an end surface measuring device 40 shown in FIG. 7 for axially positioning a workpiece W is disposed is changed, or where the kind of workpieces W to be machined is changed, the table position Zb at which the measuring device 40 issues a sizing signal has to be set again. For this setting operation, an image shown in FIG. 3 is displayed on the CRT screen 22a, and the work table 11 is moved to the state in which the measuring device 40 is engaged at its probe with a reference end surface Wa of the workpiece W to generate a sizing signal. The position storage command switch 33 is then depressed, in response to which the CPU 30 executes steps (1), (2), (8) and (9) of FIG. 8. Thus, the present position Z of the work table 11 in such a state is set as the value Zb to be stored in a memory address for the value Zb in step (10).

III Position of Dressing Tool

Where the dressing tool 19 attached to the tail stock 18 is replaced with new one or where the tail stock 18 is moved for adjustment, the positions Xd and Zd of the dressing tool 19 in the X and Y-axis directions have to be set again.

Figure 4:
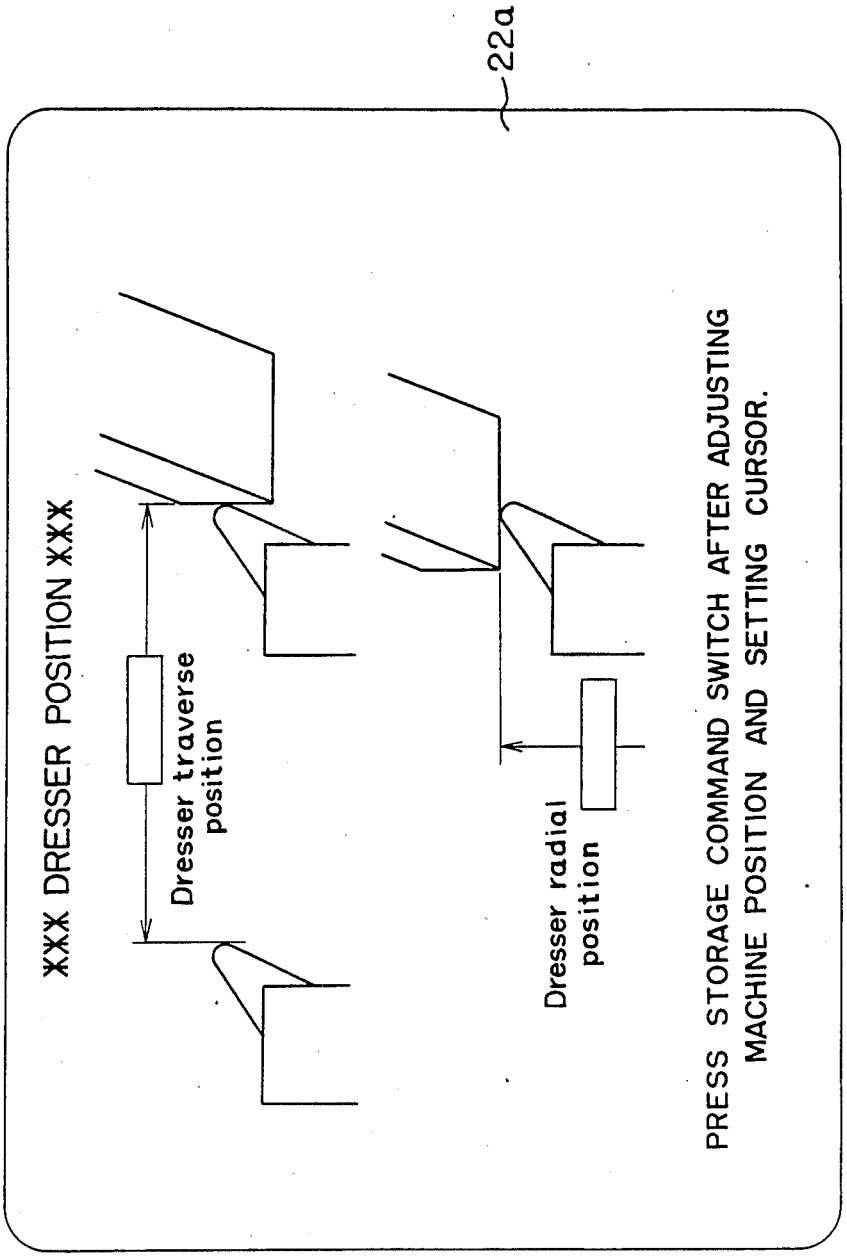
FIG. 4 is another image displayed on the CRT screen for setting the position of a dressing tool.

An image to be displayed on the CRT screen 22a is selected as shown in FIG. 4, and then, the cursor on the screen 22a is moved into a rectangular frame for dresser radial position. After the cylindrical grinding surface Ga is brought into slight contact with the dressing tool 19, the position storage command switch 33 is depressed, in response to which the CPU 30 executes steps (1), (2), (8), (11), (12) and (13) of FIG. 8. Thus, the present position X of the wheel head 12 in this state is set as a distance Xd between the workpiece rotational axis Os and the tip of the dressing tool 19 in the X-axis direction, and the distance Xd is stored in a memory address therefor in step (14).

Subsequently, the cursor on the CRT screen 22a is moved into a rectangular frame for dresser traverse position. Then, the shoulder grinding surface Gb is brought into slight contact with the dressing tool 19, and the position storage command switch 33 is depressed. The depression of this switch 33 causes the CPU 30 to execute the steps (12), (15) and (16) of FIG. 8, whereby the present position Z of the work table 11 in this state is set as a distance Zd between the shoulder grinding surface Gb and the dressing tool 19 in the Y-axis direction to be stored in a memory address for the value Zd.

IV. Master Setting Position of NC Sizing Device

Figure 5:
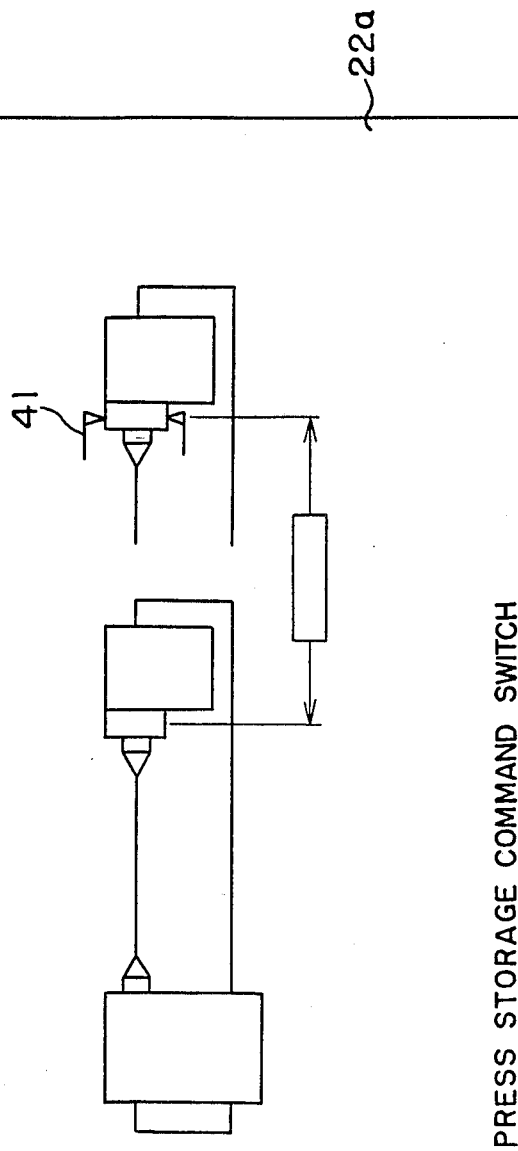
FIG. 5 is a further image displayed on the CRT screen for setting the master setting position of a numerical control diameter sizing device.

The tail stock 18 is provided with a gauging master 18a which is used for master setting of a NC (numerical control) sizing device 41 shown in FIG. 5. Thus, where the position of the tail stock 18 in the Y-axis direction is changed, a master setting position Za has also to be changed.

In this case, an image shown in FIG. 5 is selected to be displayed on the CRT screen 22a. A pair of probes of the NC sizing device 41 is brought into a state to embrace the gauging master 18a, and the position storage command switch 33 is depressed. Upon depression of the command switch 33, the CPU 30 executes steps (1), (2), (8), (11), (17) and (18) of FIG. 8, whereby the master setting position Za is calculated from an equation $(Za = Mz - Wz - Z)$ so as to be stored in a memory address therefor.

FIG. 9 shows a flow chart of a routine executed by the CPU 30 for enabling the operator to select one of the above-noted images to be displayed on the CRT screen 22a. This routine is initiated upon turning of a position setting selector switch 35 of the switch box 32 shown in FIG. 6, and in step (20), a page counter is initialized to indicate zero. When a next page switch 34 of the switch box 32 is depressed, the routine is moved from step (21) to (22), in which the content of the page counter is incremented. One of the images shown in FIGS. 2 through 5 is displayed on the CRT screen 22a in step 23, whereafter return is made to step (21). When the depression of the next page switch 34 is not ascertained in step (21), step (24) is reached to ascertain whether the position setting selector switch 35 is in OFF state or not. The routine of the CPU 30 is returned to step (21) when the selector switch 35 is in ON state, but is discontinued when the selector switch 35 is in OFF state.

Although the aforementioned embodiment is directed to a grinding machine, it is to be noted that the present invention is not limited only to the grinding machine. That is, also in machining centers, numerical control lathes and other numerical control machine tools, machine origins and other positions of the machine components are changed in connection with the change in kind of workpieces, and the present invention may be applied to inputting machine position data after such changes.

Obviously numerous modifications and variations of the present invention are possible in light of the above teachings. It is therefore to be understood that within the scope of the appended claims, the present invention may be practiced otherwise than as specifically described herein.

What is claimed is:

1. An interactive numerical controller for a machine tool wherein initial setting positions of a plurality of components are changed prior to a machining operation performed in accordance with a numerical control program, said numerical controller comprising:

memory means for storing said numerical control program and data used for numerical control of said machining operation;

image display means having a display screen for displaying a plurality of images each showing a state to which said components of said machine tool are to be moved;

image selector means for selecting one of said images which is to be displayed on said display screen;

feed control means having a manually operable device for moving said components of said machine tool to one of said states being displayed on said display screen so as to initially determine the relative positions between said components;

calculation means for calculating position data to be used for numerical control of said machining operation, based upon present positions of said components in the state being displayed on said display screen; and storage control means for storing said position data calculated by said calculation means in an address of said memory means allocated to said position data.

2. An interactive numerical controller as set forth in claim 1, wherein:

said calculation means is operable to calculate said position data based upon one of equations which is determined depending upon the state being displayed on said display screen.

3. An interactive numerical controller as set forth in claim 2, wherein:

said storage control means stores said position data in an address of said memory means determined depending upon one of said images being displayed on said display screen.

4. An interactive numerical controller as set forth in claim 3, wherein said machine tool is a grinding machine of the type that:

a work table and a grinding wheel head are movable respectively in first and second directions perpendicular to each other;

a work head and a tail stock are mounted on said work table for rotatably carrying a workpiece about an axis extending in said first direction; and initial setting positions of said wheel head and said tail stock are changed in connection respectively with the replacement of a life-expired grinding wheel carried on said wheel head with a fresh grinding wheel and the change in kind of workpieces to be ground.

* * * * *